United States Patent
Hiraishi

(10) Patent No.: US 10,576,791 B2
(45) Date of Patent: Mar. 3, 2020

(54) TIRE

(71) Applicant: BRIDGESTONE CORPORATION, Tokyo (JP)

(72) Inventor: Tomohiro Hiraishi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 310 days.

(21) Appl. No.: 15/259,215

(22) Filed: Sep. 8, 2016

(65) Prior Publication Data

US 2017/0066291 A1 Mar. 9, 2017

(30) Foreign Application Priority Data

Sep. 9, 2015 (JP) .................................. 2015-177880

(51) Int. Cl.
 *B60C 11/12* (2006.01)
 *B60C 11/03* (2006.01)

(52) U.S. Cl.
 CPC ...... *B60C 11/1222* (2013.01); *B60C 11/0302* (2013.01); *B60C 11/124* (2013.01); *B60C 11/1218* (2013.01); *B60C 2011/0341* (2013.01); *B60C 2011/1227* (2013.01)

(58) Field of Classification Search
 CPC ............. B60C 11/0302; B60C 11/1218; B60C 11/1236; B60C 2011/1227
 See application file for complete search history.

(56) References Cited

U.S. PATENT DOCUMENTS

| | | | |
|---|---|---|---|
| 2007/0295434 A1 | 12/2007 | Nguyen et al. | |
| 2008/0156405 A1* | 7/2008 | Tanabe | B60C 11/11 152/209.18 |
| 2012/0273108 A1* | 11/2012 | Yoshida | B60C 11/12 152/209.25 |
| 2015/0013865 A1* | 1/2015 | Yoshikawa | B60C 11/1218 152/209.18 |

FOREIGN PATENT DOCUMENTS

| | | |
|---|---|---|
| CH | 172548 A | 10/1934 |
| CN | 101190644 A | 6/2008 |
| DE | 102007044435 | * 3/2009 |

(Continued)

OTHER PUBLICATIONS

English machine translation of DE102007044435. (Year: 2009).*

(Continued)

*Primary Examiner* — Robert C Dye
(74) *Attorney, Agent, or Firm* — Sughrue Mion, PLLC

(57) ABSTRACT

A tire includes sipes, on a surface of a tread of the tire, extending towards the direction of tire rotation from the tread edge side to the tire equator side of the surface of the tread. The sipes are disposed at intervals in the circumferential direction of the tread. In each of the sipes disposed at the tread edge side, a plane that follows the shape of the opening of the sipe and extends in the tire radial direction from the opening is defined as a reference plane, and each of the sipes disposed at the tread edge side is formed to include an extending portion that extends along the reference plane in the tire radial direction from the opening and a protruding portion that protrudes from the reference plane towards the direction of tire rotation and returns to the reference plane via a bend.

12 Claims, 7 Drawing Sheets

(56) References Cited

FOREIGN PATENT DOCUMENTS

| DE | 202008018041 U1 | | 6/2011 |
|---|---|---|---|
| EP | 3 025 877 A1 | | 6/2016 |
| JP | 10-129218 A | | 5/1998 |
| JP | 2002-103921 A | | 4/2002 |
| JP | 2006-151226 A | | 6/2006 |
| JP | 2006-298055 | * | 11/2006 |
| JP | 2006-341816 A | | 12/2006 |
| JP | 2008-132809 A | | 6/2008 |
| JP | 2013-112130 A | | 6/2013 |
| JP | 2013-244811 A | | 12/2013 |
| JP | 2013-244812 A | | 12/2013 |
| JP | 2014-46743 A | | 3/2014 |
| JP | 2014-514201 A | | 6/2014 |
| JP | 2014-136559 A | | 7/2014 |
| JP | 2014-172484 A | | 9/2014 |
| JP | 2015-24733 A | | 2/2015 |
| JP | 2016-68719 A | | 5/2016 |
| JP | 2017-1468 A | | 1/2017 |
| WO | WO9948707 | * | 9/1999 |
| WO | WO2013/114852 | * | 12/2013 |
| WO | 2015/012049 A1 | | 1/2015 |

OTHER PUBLICATIONS

Communication dated Jul. 16, 2018, from the European Patent Office in counterpart European Application No. 16843939.6.
Communication dated Mar. 7, 2019 from the China National Intellectual Property of Administration in counterpart Application No. 201680051421.4.

* cited by examiner

A-A cross-section

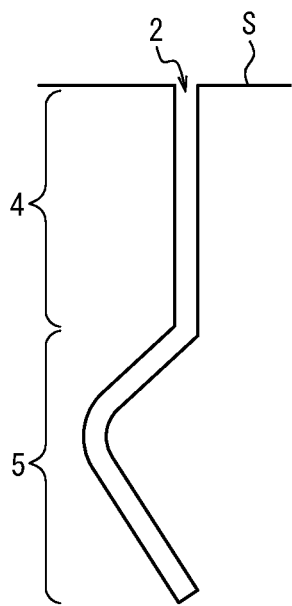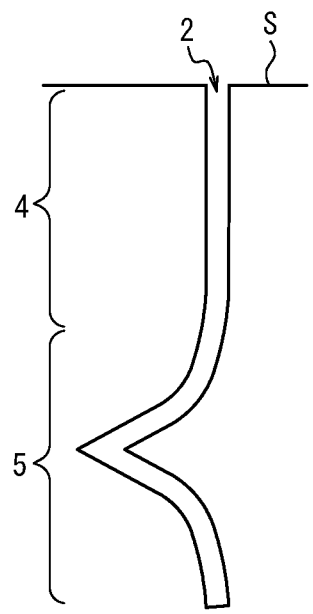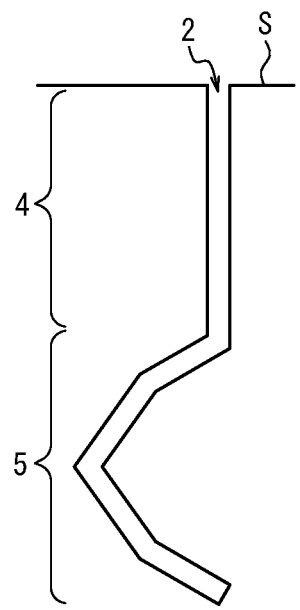

B-B cross-section

TIRE

TECHNICAL FIELD

This disclosure relates to a tire, and in particular to a high-performance tire with excellent drainage performance and turning performance.

BACKGROUND

In recent years, braking performance and driving performance on icy and snowy roads and wet road surfaces have been improved by providing multiple sipes, which are narrow grooves formed by incision, on the tread surface of a tire. Specifically, by providing sipes, an increase in the edge component is expected on icy and snowy roads, and enhanced drainage performance is expected on wet road surfaces. In either case, in addition to these aspects of performance, modifications to the shape of the sipes are being tested with regard to performance on dry road surfaces.

For example, with regard to suppressing the collapsing deformation of a block when introducing a sipe into the block, JP 2006-341816 A (PTL 1) proposes forming the sipe in the block to extend from the tread surface inwards in the tire radial direction while bending a plurality of times so as to have a zigzag-shape. It was discovered, however, that with such a sipe extending in a zigzag-shape, the location at which the blocks support each other from collapsing differs in the direction of sipe depth (tire radial direction) depending on the direction of input of force on the tread surface with respect to the land portion when the tire rolls. The effect of mutual support is thus easily dispersed.

To address this issue, JP 2013-244811 A (PTL 2) discloses a structure in which, among a plurality of bending points in a sipe that extends in a zigzag shape, a center region in the sipe depth direction is designated as a main-bend point, and two relatively large faces are provided in the center region in the sipe depth direction, thereby preventing the support locations of the sipe from being dispersed in the sipe depth direction depending on the direction of input of force to the block.

Since performance on icy and snowy roads is mainly emphasized for the tires disclosed in PTL 1 and PTL 2, these tires have a tread pattern of blocks defined by width direction grooves and circumferential grooves. When sipes are introduced into the blocks in such a tread pattern, the above-described problem of block collapse occurs. On the other hand, in a high-performance tire that guarantees performance up to high speeds, circumferential direction rigidity when driving at high speed is typically ensured by a rib-shaped land portion that is defined only by circumferential grooves and is continuous in the tread circumferential direction. For drainage performance, a tire having such a rib pattern may be provided with sipes extending in the width direction of the tread at an inclination relative to the tire equator. In other words, the tire is used with a designated rotation direction, with the sipes disposed to extend towards the tire rotation direction from the tread edge side to the tire equator side of the tread surface. In such a high-performance tire, the effect of the local reduction in land portion rigidity due to width direction sipes provided in the rib becomes a problem when a strong lateral force is applied to the tire, for example when changing lanes or turning at high speed on a circuit. Accordingly, in addition to drainage performance, there is a strong desire to improve turning performance at high speed with a tire having sipes in the rib-shaped land portion.

In other words, in the aforementioned tire that guarantees performance up to high speeds, there is a demand for using sipes to ensure drainage performance on wet road surfaces, while also suppressing a reduction in width direction rigidity of the tread on dry road surfaces and improving turning performance, in particular turning performance when driving at high speeds.

CITATION LIST

Patent Literature

PTL 1: JP 2006-341816 A
PTL 2: JP 2013-244811 A

SUMMARY

It would therefore be helpful to provide a tire that makes drainage performance and turning performance compatible to a high degree, in particular when driving at high speeds.

We repeatedly examined a way to make drainage performance and turning performance compatible in a tire that guarantees performance up to high speeds. As a result, we discovered that when turning at high speed, resistance to lateral force is ensured by providing the shape of sipes with displacement that follows the tire rotation direction.

We provide the following:

(1) A tire comprising a plurality of sipes, on a surface of a tread of the tire, extending towards a direction of tire rotation from a tread edge side to a tire equator side of the surface of the tread, the sipes being disposed at intervals in a circumferential direction of the tread, wherein in each of the sipes disposed at the tread edge side, a plane that follows a shape of an opening of the sipe and extends in a tire radial direction from the opening is defined as a reference plane, and each of the sipes disposed at the tread edge side is formed to include an extending portion that extends along the reference plane in the tire radial direction from the opening and a protruding portion that protrudes from the reference plane towards the direction of tire rotation and returns to the reference plane via a bend.

A tire with such a structure makes drainage performance and turning performance compatible to a high degree. Drainage performance and turning performance can be further improved with the structures of (2) to (7) below.

(2) A tire in which the sipes disposed at the tread edge side are disposed in a region that is 28% or more to 45% or less of a width of the tread from the tread edge.

(3) A tire further comprising a plurality of width direction sipes, extending across the tire equator in a width direction, in a center region sandwiched between regions that include the sipes disposed at the tread edge side.

(4) A tire in which in each of the width direction sipes, a plane that follows a shape of an opening of the sipe and extends in a tire radial direction from the opening is defined as a reference plane, and each of the width direction sipes is formed to include an extending portion that extends along the reference plane in the tire radial direction from the opening and a protruding portion that protrudes from the reference plane towards an opposite direction from the direction of tire rotation and returns to the reference plane via a bend.

(5) A tire in which the surface of the tread comprises two circumferential grooves extending along the tire equator, a center land portion is defined between the circumferential grooves, and shoulder land portions are defined between the circumferential grooves and tread edges.

(6) A tire in which the sipes disposed at the tread edge side are disposed in the shoulder land portions.

(7) A tire in which the width direction sipes are disposed in the center land portion.

(8) A tire in which a length of the sipes disposed at the tread edge side is 60% or more to 85% or less of a thickness of a rubber portion of the tread.

(9) A tire in which a radial length of the extending portion is 35% or more to 65% or less of a radial length of the sipes disposed at the tread edge side.

(10) A tire in which a radial length of the protruding portion is 35% or more to 65% or less of a radial length of the sipes disposed at the tread edge side.

(11) A tire in which an amount of protrusion of the protruding portion of the sipes disposed at the tread edge side is 90% or more to 100% or less of a radial length from protrusion to bending of the protruding portion.

(12) A tire in which an amount of protrusion of the protruding portion of the sipes disposed at the tread edge side is 40% or more to 60% or less of a radial length of the extending portion.

(13) A tire in which each of the sipes disposed at the tread edge is formed to include a protruding region that extends in a direction of extension of the sipe along the surface of the tread and plate-like regions that extend linearly along the reference plane at either side of the protruding region in the width direction thereof.

(14) A tire in which the plate-like regions are 50% or less of a length, in a tire width direction, of the sipes disposed at the tread edge side.

It is thus possible to provide a tire in which drainage performance and turning performance are compatible to a high degree under conditions such as driving at high speeds.

BRIEF DESCRIPTION OF THE DRAWINGS

In the accompanying drawings:

FIGS. 4A to 4C are cross-sectional diagrams illustrating variations on the sipes of FIG. 2A and FIG. 6;

DETAILED DESCRIPTION

Tires according to disclosed embodiments are described in detail below, with reference to the drawings.

While not illustrated, the tire according to this disclosure includes sidewall portions extending in the radial direction from each of a pair of bead portions; a crown portion that extends between the sidewall portions and includes a tread portion; a carcass that extends from one bead portion across the crown portion to the other bead portion and is formed by plies of organic fiber cords or steel cords; and a belt formed by a steel cord layer disposed between the carcass and the tread.

Embodiment 1

Figure 1:
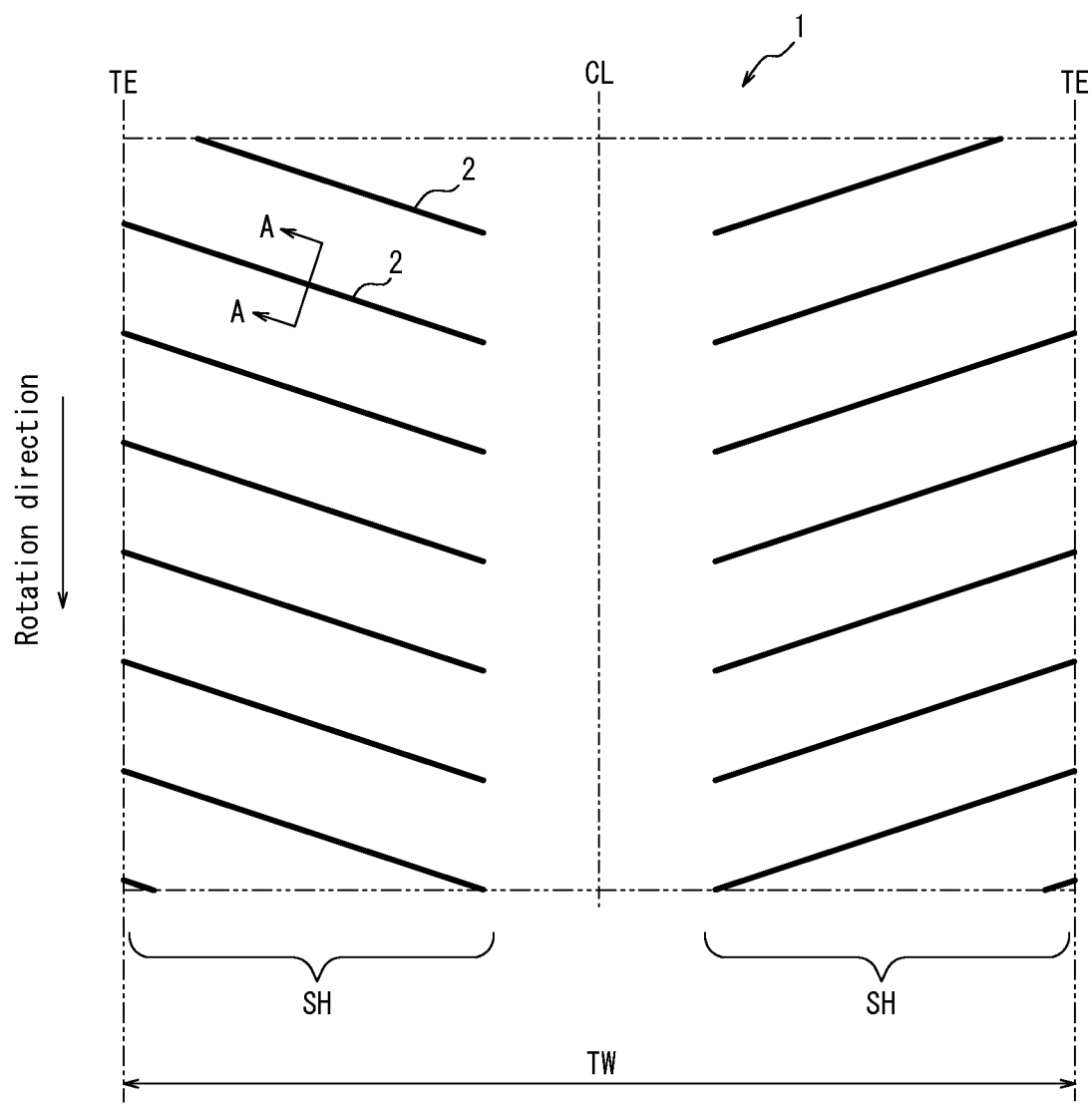
FIG. 1 is a developed view of the tread surface of a tire according to one of the disclosed embodiments.

FIG. 1 is a developed view of the tread surface of a tire according to one of the disclosed embodiments. The tire having the tread pattern illustrated in FIG. 1 is mounted on a vehicle, with the rotation direction being designated as the direction of forward movement of the vehicle. On a surface of the tread (tread surface) 1, this tire includes a plurality of sipes 2 extending towards the tire rotation direction from the tread edge side to the tire equator side of the tread surface. The sipes 2 are disposed at intervals in the circumferential direction of the tread. In the illustrated example, a plurality of sipes 2 extending towards the tire rotation direction from the tread edge TE to the equator CL side are provided on the tread surface 1, arranged at equal intervals in the circumferential direction. The sipes 2 extend on the tread surface 1 without crossing the equator CL. In the illustrated example, one end of each sipe 2 opens to the tread edge TE, and the other end terminates within one of the regions on the tread surface 1 that oppose each other with the tire equator therebetween.

When driving on a wet road surface, the sipes 2 repeatedly take in moisture within the ground contact region of the tread and eject the moisture outside of the ground contact region, thereby improving the drainage performance of the tire.

The sipes 2 as referred to here are incisions with a width of 0.1 mm to 0.4 mm, which is a width allowing at least partial contact between walls of the sipes when the tread surface 1 contacts the ground.

Figure 2A:
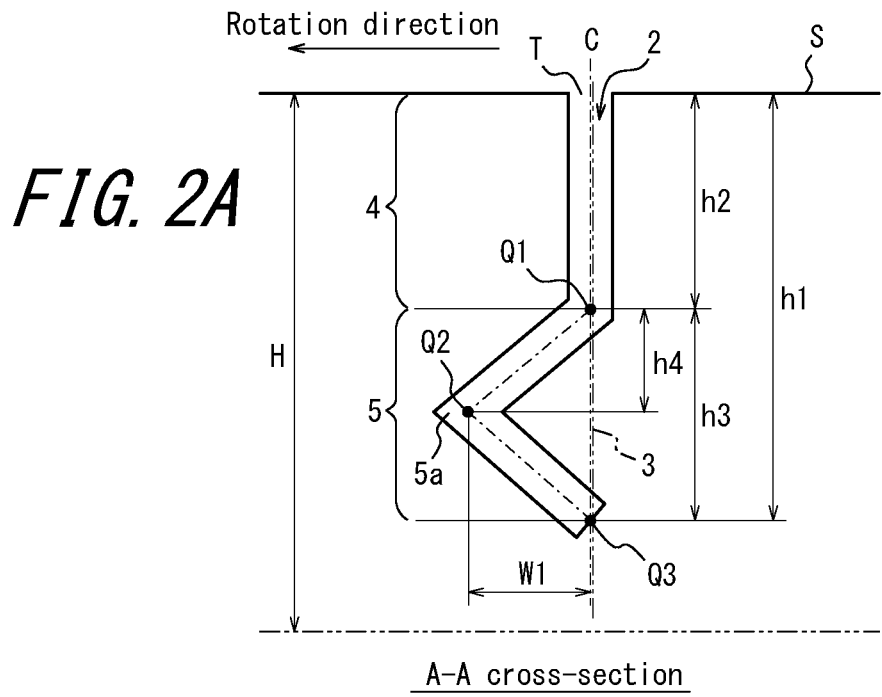
FIG. 2A is a cross-sectional diagram along the A-A line in FIG. 1.
Figure 2B:
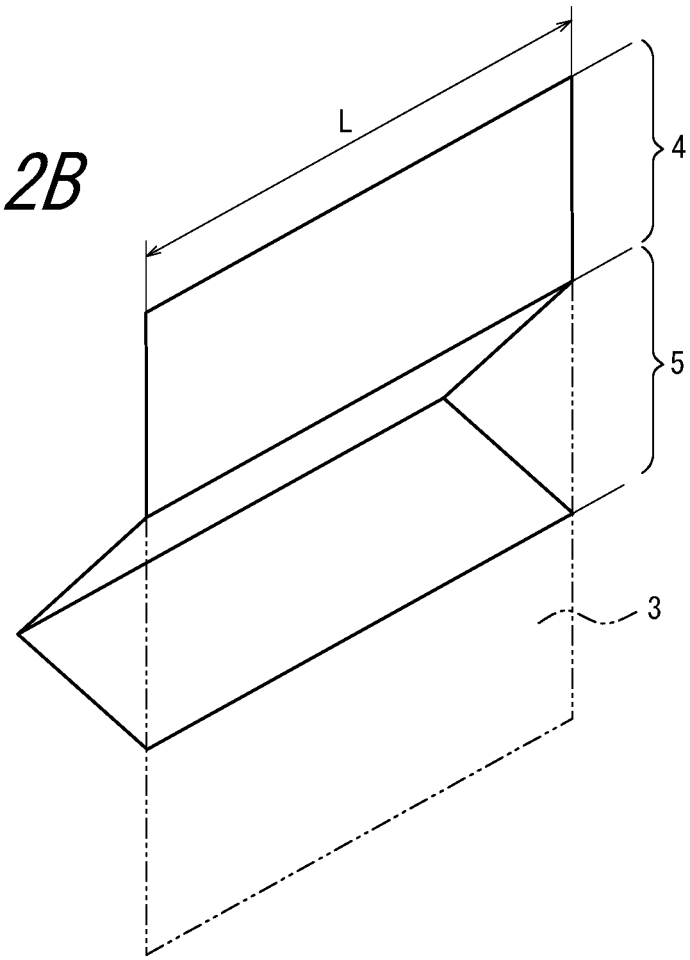
FIG. 2B illustrates the shape of the sipes 2 in the width direction of the sipes 2.

FIG. 2A is a cross-sectional diagram along the A-A line of the sipe 2 in FIG. 1. FIG. 2B illustrates the shape of the sipe 2 along the longitudinal direction of the opening. Although the sipe 2 is a space defined by being surrounded by two walls that extend in the tire radial direction from the tread surface 1 at a certain opening width, FIG. 2B illustrates the shape of the sipe 2 via the shape of one of the walls.

In each sipe 2, a plane that follows the shape of the opening T of the sipe on the tread surface S of the tire and extends in the tire radial direction from the opening T is defined as a reference plane 3, and each sipe 2 is formed to include an extending portion 4 that follows the shape of the opening T and extends along the reference plane 3 in the tire radial direction from the opening T and a protruding portion 5 that protrudes from the reference plane 3 towards the tire rotation direction and returns to the reference plane 3 via a bend 5a.

According to this structure, while ensuring drainage performance during straight running, a partial reduction in the land portion rigidity during vehicle cornering or lane changing can be suppressed, thereby improving the turning performance. In other words, when turning at high speed, a lateral force corresponding to the vehicle speed or the degree of turning is generated in the tire, and when the sipe 2 is located within the ground contact region, the walls that define the sipe easily separate. The land portion rigidity at that portion is thus reduced. Therefore, by providing the aforementioned protruding portion 5 in the center region in the sipe depth direction, the sipe is provided with a shape that resists the lateral input of force. The reason for providing the protruding portion 5 via the extending portion 4 by the opening is as follows. Forming the protruding portion 5 at the opening T would result in an acute angle portion at the opening, leading to a reduction in rigidity around the opening and possibly causing rubber at the acute angle portion to break off. Adopting a shape that extends from the tread surface in the radial direction to a certain depth avoids this problem.

Next, the dimensional ratios of the extending portion 4 and the protruding portion 5 in the sipe 2 are described in detail with reference to FIG. 2A. The dimensions of the sipe 2 described below are prescribed by a center line C (dashed line) traversing the center of the opening width of the sipe 2, as illustrated in FIG. 2A. In the following explanation, the "dashes" and the "portions" in the cross-section in FIG. 2A actually form "lines" and "surfaces" that extend in the extending direction of the sipes. Therefore, the sipe 2 is described as having a 3D structure in which the cross-sectional shape along the sipe width extends in the width direction.

As illustrated in FIG. 2A, in the sipe 2, the following relationships are preferably satisfied, where h1 is the length of the sipe 2 in the tire radial direction, h2 is the radial length of the extending portion 4 in the tire radial direction from the opening T to Q1 on the center line C, and h3 is similarly the radial length of the protruding portion 5 from Q1 to Q3 via Q2.

The radial length h1 of the sipe 2 is preferably 45% or more to 90% or less, more preferably 60% or more to 85% or less, of the tread thickness H, which is defined as the thickness of the rubber portion on the outside of the belt layer in the tire radial direction. If the radial length h1 is less than 45%, drainage performance cannot be ensured, whereas upon the radial length h1 exceeding 90%, the land portion rigidity of the tread surface 1 around the sipe reduces.

The radial length h2 of the extending portion 4 is preferably 10% or more to 75% or less, more preferably 35% or more to 65% or less, of the radial length h1 of the sipe. Such a relationship makes it possible both to ensure the drainage performance and suppress reduction of the land portion rigidity.

The radial length h3 of the protruding portion 5 is preferably 25% or more to 90% or less, more preferably 35% or more to 65% or less, of the radial length h1 of the sipe. Such a relationship makes it possible both to ensure the drainage performance and suppress reduction of the land portion rigidity.

Furthermore, the amount of protrusion W1 of the protruding portion 5 of the sipe 2 (the distance in the rotation direction from Q1 to Q2) is preferably 90% or more to 100% or less of the radial length h4 from Q1 to Q2, namely the radial length from protrusion to bending of the protruding portion. If the amount of protrusion W1 is less than 90%, deformation of the sipe cannot be sufficiently suppressed, whereas upon the amount of protrusion W1 exceeding 100%, the tire becomes difficult to extract from the mold after vulcanization, which is a problem that needs to be avoided.

The amount of protrusion W1 of the protruding portion 5 of the sipe 2 is preferably 15% or more to 100% or less, more preferably 40% or more to 60% or less, of the radial length h2 of the extending portion 4. Such a relationship prevents the rubber between the protruding portion and the tread surface from breaking off and prevents the problem of the tire being difficult to extract from the mold after vulcanization.

While it suffices for the sipes 2 to extend towards the tire rotation direction from the tread edge side to the tire equator side, the sipes 2 are preferably disposed in regions SH that are 28% or more to 45% or less of the tread width TW from the tread edge TE. The tread edge TW as referred to here is the direct distance from one tread edge TE to the other tread edge TE.

The ground contact pressure distribution of the tire in the tread width direction during cornering is such that ground contact pressure increases in regions adjacent to the tread edges as compared to the center region. Therefore, increasing the drainage performance in these regions adjacent to the tread edges is effective for increasing drainage performance of the tire.

Figure 3:
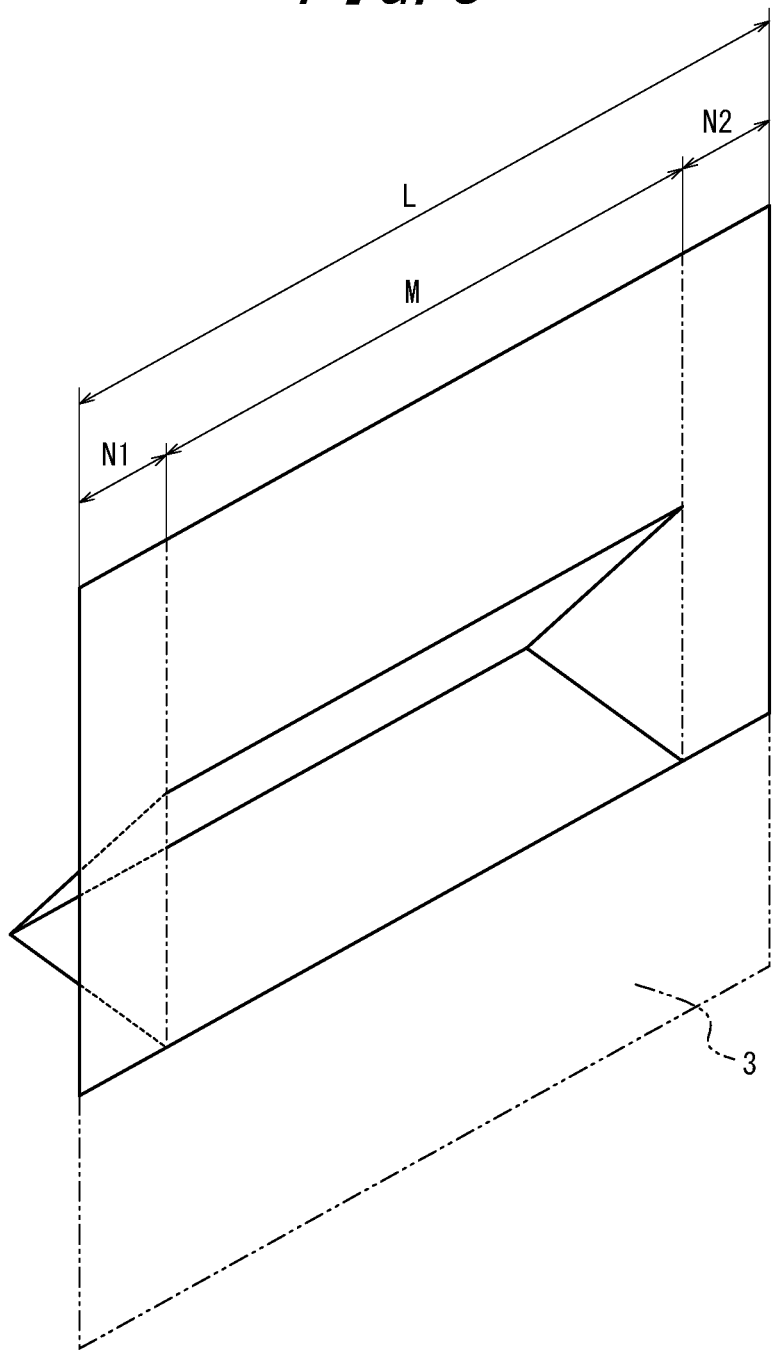
FIG. 3 illustrates the shape of the sipes 2 of this disclosure along the width direction of the sipes 2.

As illustrated in FIG. 3, the extending portion 4 formed in the radial direction of the sipe from the tread surface 1 and the protruding portion 5 in the sipes 2 may be formed to include a protruding region M that extends in the direction of extension of the sipe along the tread surface and plate-like regions N1 and N2 that extend linearly along the reference plane 3 at either side of the protruding region M in the width direction thereof.

According to this structure, there is little restriction on deformation of the sipe in the plate-like region, thereby increasing the edge effect of the sipe. Furthermore, deformation of the sipe is suppressed in the protruding region M, thereby suppressing a reduction in rigidity of the tire. This structure is also advantageous in terms of manufacturing, since the product tire can be removed from the mold reliably and without defect around the sipes.

In the example illustrated in FIG. 3, plate-like regions N1 and N2 are included at the edges of the sipe in the width direction thereof, but the sipe may also be formed to include only one plate-like region N1 or N2 at one edge in the width direction of the sipe. Furthermore, while the plate-like regions N1 and N2 and the protruding region M have the same radial depth in the illustrated example, the plate-like regions N1 and N2 and the protruding region M may have different radial depths.

The plate-like regions N1 and N2 are preferably 50% or less of the length L of the sipe in the width direction. Such a length sufficiently achieves the effect of the protruding region M suppressing deformation of the sipe.

Furthermore, the protruding portion 5 is a combination of linear shapes in the examples illustrated in FIGS. 2A and 2B and FIG. 3 but may instead have a curved shape as illustrated in FIG. 4A, a combination of curved shapes as illustrated in FIG. 4B, or a combination of shapes each formed by a line with a bend in the central portion thereof as illustrated in FIG. 4C.

Embodiment 2

Figure 5:
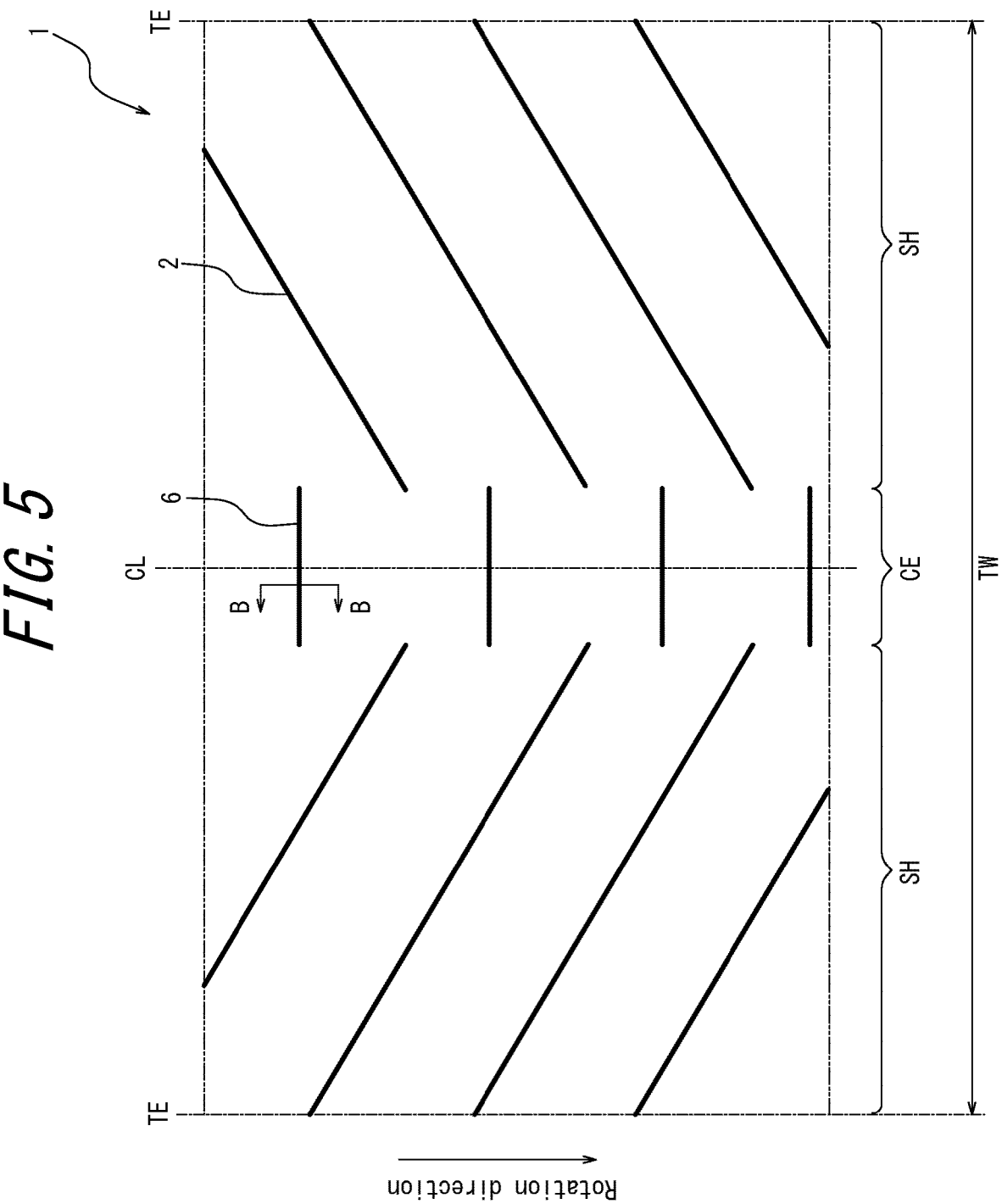
FIG. 5 is a developed view of the tread surface of a tire according to another one of the disclosed embodiments.

FIG. 5 is a developed view of the tread surface of a tire according to another one of the disclosed embodiments. The tire according to this embodiment is also a tire with a designated rotation direction. Structural components in FIG. 5 that are similar to those of FIG. 1 are labeled with the same reference signs, and a description thereof is omitted.

As illustrated in FIG. 5, a plurality of sipes 2 extending towards the tire rotation direction from the tread edge TE to the equator CL side are provided on the tread surface 1, arranged at equal intervals in the circumferential direction. Like the sipes 2 in FIG. 1, these sipes 2 extend on the tread surface 1 without crossing the equator CL. In the illustrated example, one end of each sipe 2 opens to the tread edge TE, and the other end terminates within one of the regions on the tread surface 1 that oppose each other with the tire equator therebetween.

Like the sipes 2 in FIG. 1, it is crucial that these sipes 2 have the structure with the extending portion 4 and the protruding portion 5 illustrated in FIGS. 2A and 2B. In other words, in each sipe 2, a plane that follows the shape of the opening T of the sipe on the tread surface S of the tire and extends in the tire radial direction from the opening T is defined as a reference plane 3, and each sipe 2 is formed to include an extending portion 4 that follows the shape of the opening T and extends along the reference plane 3 in the tire radial direction from the opening T and a protruding portion 5 that protrudes from the reference plane 3 towards the tire rotation direction and returns to the reference plane 3 via a bend 5a.

According to this structure, while ensuring drainage performance during straight running, a partial reduction in the land portion rigidity during vehicle cornering or lane changing can be suppressed, thereby improving the turning performance. The reason for providing the protruding portion 5 via the extending portion 4 by the opening is as follows. Forming the protruding portion 5 at the opening T would result in an acute angle portion at the opening, leading to a reduction in rigidity around the opening and possibly causing rubber at the acute angle portion to break off. Adopting a shape that extends from the tread surface in the radial direction to a certain depth avoids this problem.

Furthermore, like the sipes 2 in FIG. 1, the sipes 2 may, as illustrated in FIG. 3, be formed to include a protruding region M that extends in the direction of extension of the sipe along the tread surface and plate-like regions N1 and N2 that extend linearly along the reference plane 3 at either side of the protruding region M in the width direction thereof. The protruding portion 5 is a combination of linear shapes but may instead have a curved shape as illustrated in FIG. 4A, a combination of curved shapes as illustrated in FIG. 4B, or a combination of shapes each formed by a line with a bend in the central portion thereof as illustrated in FIG. 4C.

The sipes 2 may be chamfered at the opening edge of the walls that define the sipe to improve the drainage performance on wet road surfaces.

Regions SH in which the sipes 2 are provided are preferably regions that occupy 28% or more to 45% or less of the tread width TW from the tread edge TE.

The ground contact pressure distribution of the tire in the tread width direction during cornering is such that ground contact pressure increases in regions adjacent to the tread edges as compared to the center region. Therefore, increasing the drainage performance in these regions adjacent to the tread edges further improves the drainage performance of the tire.

As illustrated in FIG. 5, a plurality of width direction sipes 6 extending across the tire equator CL in the width direction are provided on the tread surface 1 of the tire in a center region CE sandwiched between the regions SH where the sipes 2 are disposed at the tread edge sides.

The ground contact pressure distribution of the tire in the tire width direction during straight running is such that ground contact pressure tends to increase relatively in the center region of the tire, and providing such sipes in the center region CE is particularly effective for increasing drainage performance during straight running. The radial shape of the width direction sipes 6 may be a straight extension or a shape including an extending portion and a protruding portion, as described below.

The center region CE in which the width direction sipes 6 are provided is preferably 5% or more to 22% or less of the tread width TW from the equator CL. Such a width more reliably ensures the drainage performance of the tire.

Figure 6:
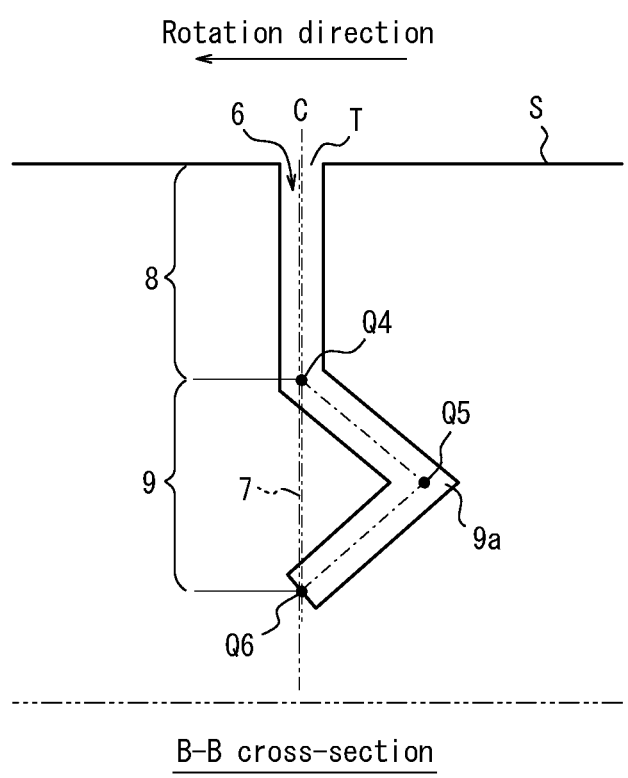
FIG. 6 is a cross-sectional diagram along the B-B line in FIG. 5.

The following illustrates a preferred embodiment of the radial shape of the width direction sipes 6. FIG. 6 is a cross-sectional diagram along the B-B line of the width direction sipe 6 in FIG. 5.

In each width direction sipe 6, a plane that follows the shape of the opening T of the sipe on the tread surface S of the tire and extends in the tire radial direction from the opening T is defined as a reference plane 7, and each sipe 6 is formed to include an extending portion 8 that follows the shape of the opening T and extends along the reference plane 7 in the tire radial direction from the opening T and a protruding portion 9 that protrudes from the reference plane 7 towards the opposite direction from the tire rotation direction and returns to the reference plane 7 via a bend 9a.

According to this structure, the drainage performance and braking performance can be ensured during straight running. In other words, the ground contact pressure distribution of the tire in the tread width direction during braking is such that ground contact pressure tends to increase in the center region as compared to the tread edges. If the land portion rigidity of the center region is reduced, the braking performance of the tire might deteriorate. Therefore, in order to suppress a reduction in land portion rigidity during braking, a protruding portion that protrudes in a direction that resists the rotational force is provided, thereby suppressing deformation around the sipe with respect to the circumferential input of force and improving braking performance by ensuring rigidity. The reason for providing the protruding portion 9 via the extending portion 8 is as follows. Forming the protruding portion 9 at the opening T would result in an acute angle portion at the opening, leading to a reduction in rigidity around the opening and possibly causing rubber at the acute angle portion to break off. Adopting a shape that extends from the tread surface in the radial direction to a certain depth avoids this problem.

The shapes, in the radial direction, of the sipes 2 formed in the regions SH and of the width direction sipes 6 formed in the center region CE are formed to protrude in opposite directions relative to the tire rotation direction in order to allow suppression of a reduction in rigidity corresponding to both cornering and braking situations.

Each of the width direction sipes 6 may be formed to include a protruding region that extends in the direction of extension of the sipe along the tread surface of the tire and plate-like regions that extend linearly along the reference plane at either side of the protruding region in the width direction thereof.

Furthermore, the plate-like regions may have a different radial depth than the protruding region.

The protruding portion 9 of the width direction sipe 6 is a combination of linear shapes in FIG. 6 but may instead have a curved shape as illustrated in FIG. 4A, a combination of curved shapes as illustrated in FIG. 4B, or a combination of shapes each formed by a line with a bend in the central portion thereof as illustrated in FIG. 4C.

The width direction sipes 6 may be chamfered at the opening edge of the walls that define the sipe to improve the drainage performance on wet road surfaces.

Embodiment 3

Figure 7:
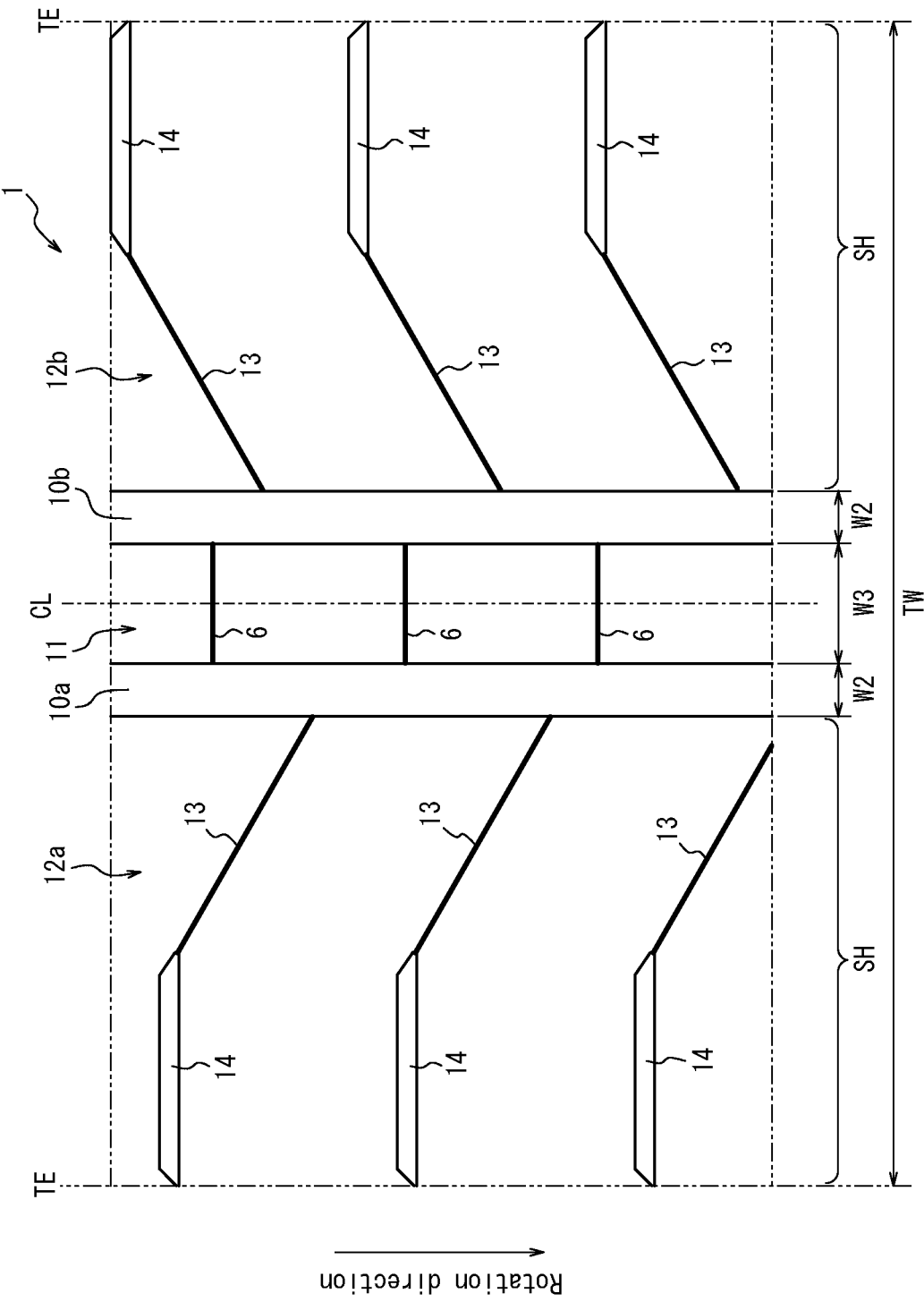
FIG. 7 is a developed view of the tread surface of a tire according to another one of the disclosed embodiments.

FIG. 7 is a developed view of the tread surface of a tire according to another one of the disclosed embodiments. The tire according to this embodiment is also a tire with a designated rotation direction. Structural components in FIG. 7 that are similar to those of FIG. 1 or 5 are labeled with the same reference signs, and a description thereof is omitted.

As illustrated in FIG. 7, three land portions are formed in this tire on the tread surface 1 and are defined by two circumferential grooves 10a and 10b, extending along the tire equator CL, and by the tread edges TE. In the illustrated example, a center land portion 11 defined between the circumferential grooves 10a and 10b and shoulder land portions 12a and 12b defined between the circumferential grooves 10a and 10b and the tread edges TE are formed.

The opening width W2 of the circumferential grooves 10a and 10b is preferably 11% or more to 15% or less of the tread width TW. Such a width suppresses a reduction in rigidity while ensuring drainage performance.

As illustrated in FIG. 7, the two shoulder land portions 12a and 12b adjacent to the tread edges TE include a plurality of sipes 13 disposed at intervals in the tread circumferential direction. In the illustrated example, the sipes 13 are grooves with a narrow opening width, formed so that one end opens to the circumferential groove 10a or 10b, and the other end extends toward the tread edge TE and terminates near the center of the shoulder land portion 12a or 12b in the width direction. In each of the shoulder land portions 12a and 12b, the sipes 13 are arranged at equal intervals in the tread circumferential direction, and the positions thereof are shifted in the tread circumferential direction between the shoulder land portions 12a and 12b.

When driving on a wet road surface, the sipes 13 repeatedly take in moisture within the ground contact region of the tread and eject the moisture outside of the ground contact region, thereby enhancing the drainage performance of the tire.

In the illustrated example, the tire includes lateral grooves 14 that extend from the tread edges TE to near the center of the shoulder land portions 12a and 12b in the width direction. The sipes 13 are in communication with the lateral grooves 14 near the center of the shoulder land portions 12a and 12b in the width direction.

The reason why the sipes 13 and lateral grooves 14 are provided in the shoulder land portions 12a and 12b adjacent to the tread edges TE is as follows. The ground contact pressure distribution of the tire in the tread width direction during vehicle cornering is such that ground contact pressure increases in regions adjacent to the tread edges as compared to the center region. Therefore, increasing the drainage performance in these regions adjacent to the tread edges is effective for increasing drainage performance of the tire.

Like the sipes 2 in FIG. 1, it is crucial that these sipes 13 have the structure with the extending portion 4 and the protruding portion 5 illustrated in FIGS. 2A and 2B. In other words, in each sipe 13, a plane that follows the shape of the opening T of the sipe on the tread surface S of the tire and extends in the tire radial direction from the opening T is defined as a reference plane 3, and each sipe 13 is formed to include an extending portion 4 that follows the shape of the opening T and extends along the reference plane 3 in the tire radial direction from the opening T and a protruding portion 5 that protrudes from the reference plane 3 towards the tire rotation direction and returns to the reference plane 3 via a bend 5a.

According to this structure, while ensuring drainage performance during straight running, a partial reduction in the land portion rigidity during vehicle cornering or lane changing can be suppressed, thereby improving the turning performance. In other words, when turning at high speed, a lateral force corresponding to the vehicle speed or the degree of turning is generated in the tire, and when the sipe 13 is located within the ground contact region, the walls that define the sipe easily separate. The land portion rigidity at that portion is thus reduced. Therefore, by providing the aforementioned protruding portion 5 in the center region in the sipe depth direction, the sipe is provided with a shape that resists the lateral input of force. The reason for providing the protruding portion 5 via the extending portion 4 by the opening is as follows. Forming the protruding portion 5 at the opening T would result in an acute angle portion at the opening, leading to a reduction in rigidity around the opening and possibly causing rubber at the acute angle portion to break off. Adopting a shape that extends from the tread surface in the radial direction to a certain depth avoids this problem.

Furthermore, like the sipes 2, the sipes 13 may, as illustrated in FIG. 3, be formed to include a protruding region M that extends in the direction of extension of the sipe along the tread surface and plate-like regions N1 and N2 that extend linearly along the reference plane 3 at either side of the protruding region M in the width direction thereof. The protruding portion 5 is a combination of linear shapes but may instead have a curved shape as illustrated in FIG. 4A, a combination of curved shapes as illustrated in FIG. 4B, or a combination of shapes each formed by a line with a bend in the central portion thereof as illustrated in FIG. 4C.

The sipes 13 may be chamfered at the opening edge of the walls that define the sipe to improve the drainage performance on wet road surfaces.

The sipes 13 are provided preferably in the regions SH that occupy 28% or more to 45% or less of the tread width TW from the tread edge TE. While FIG. 7 shows an example in which the regions SH where the sipes 13 are provided are the same as the shoulder land portions 12a and 12b, the regions SH do not have to be the same as the shoulder land portions 12a and 12b.

The ground contact pressure distribution of the tire in the tread width direction during cornering is such that ground contact pressure increases in regions adjacent to the tread edges as compared to the center region. Therefore, increasing the drainage performance in these regions is effective for further increasing drainage performance of the tire.

In FIG. 7, the center land portion 11 includes the width direction sipes 6 that connect the circumferential grooves 10a and 10b, and in the illustrated example, the plurality of width direction sipes 6 that are in communication with the circumferential grooves 10a and 10b are disposed at equal intervals in the circumferential direction. The ground contact pressure distribution of the tire in the tire width direction during straight running is such that ground contact pressure tends to increase relatively in the center region of the tire, and providing sipes in such a region is particularly effective for increasing drainage performance during straight running.

The width direction sipes 6 in the center land portion 11 have a similar structure to that of the width direction sipes 6 in FIG. 5. In each width direction sipe 6, as illustrated in FIG. 6, a plane that follows the shape of the opening T of the sipe on the tread surface S of the tire and extends in the tire radial direction from the opening T is defined as a reference plane 7, and each sipe 6 is formed to include an extending portion 8 that follows the shape of the opening T and extends along the reference plane 7 in the tire radial direction from the opening T and a protruding portion 9 that protrudes from the reference plane 7 towards the opposite direction from the tire rotation direction and returns to the reference plane 7 via a bend 9a.

According to this structure, the drainage performance and braking performance can be ensured during straight running. In other words, the ground contact pressure distribution of the tire in the tread width direction during braking is such that ground contact pressure tends to increase in the center region as compared to the tread edges. If the land portion rigidity of the center region is reduced, the braking performance of the tire might deteriorate. Therefore, in order to suppress a reduction in land portion rigidity during braking, a protruding portion that protrudes in a direction that resists the rotational force is provided, thereby suppressing deformation around the sipe with respect to the circumferential input of force and improving braking performance by ensuring rigidity. The reason for providing the protruding portion 9 via the extending portion 8 is as follows. Forming the protruding portion 9 at the opening T would result in an acute angle portion at the opening, leading to a reduction in rigidity around the opening and possibly causing rubber at the acute angle portion to break off. Adopting a shape that extends from the tread surface in the radial direction to a certain depth avoids this problem.

The shapes, in the radial direction, of the sipes 13 formed in the shoulder land portions 12a and 12b and of the width direction sipes 6 formed in the center land portion 11 are formed to protrude in opposite directions relative to the tire rotation direction in order to allow suppression of a reduction in rigidity corresponding to both cornering and braking situations.

Each of the width direction sipes 6 may be formed to include a protruding region that extends in the direction of extension of the sipe along the tread surface of the tire and plate-like regions that extend linearly along the reference plane at either side of the protruding region in the width direction thereof.

Furthermore, the plate-like regions may have a different radial depth than the protruding region.

The protruding portion 9 of the width direction sipe 6 is a combination of linear shapes in FIG. 6 but may instead have a curved shape as illustrated in FIG. 4A, a combination of curved shapes as illustrated in FIG. 4B, or a combination of shapes each formed by a line with a bend in the central portion thereof as illustrated in FIG. 4C.

The width direction sipes 6 may be chamfered at the opening edge of the walls that define the sipe to improve the drainage performance on wet road surfaces.

The center land portion 11 in which the width direction sipes 6 are provided is preferably in a region W3 that is 5% or more to 10% or less of the total tread width TW from the equator CL. Such a width more reliably ensures the drainage performance of the tire.

The invention claimed is:

1. A tire comprising:
a plurality of sipes, on a surface of a tread of the tire, extending towards a direction of tire rotation from a tread edge side to a tire equator side of the surface of the tread, the sipes being disposed at intervals in a circumferential direction of the tread,
wherein in each of the sipes disposed at the tread edge side, a plane that follows a shape of an opening of the sipe and extends in a tire radial direction from the opening is defined as a reference plane, and each of the sipes disposed at the tread edge side is formed to consist of an extending portion that extends along the reference plane in the tire radial direction from the opening and a protruding portion that protrudes from the reference plane towards the direction of tire rotation and returns to the reference plane via a bend,
the tire further comprising a plurality of width direction sipes, extending across the tire equator in a width direction, in a center region sandwiched between regions that include the sipes disposed at the tread edge side,
wherein in each of the width direction sipes, a plane that follows a shape of an opening of the sipe and extends in a tire radial direction from the opening is defined as a reference plane, and each of the width direction sipes is formed to consist of an extending portion that extends along the reference plane in the tire radial direction from the opening and a protruding portion that protrudes from the reference plane towards an opposite direction from the direction of tire rotation and returns to the reference plane via a bend.

2. The tire of claim 1, wherein the sipes disposed at the tread edge side are disposed in a region that is 28% or more to 45% or less of a width of the tread from the tread edge.

3. The tire of claim 1, wherein the surface of the tread comprises two circumferential grooves extending along the tire equator, a center land portion is defined between the circumferential grooves, and shoulder land portions are defined between the circumferential grooves and tread edges.

4. The tire of claim 3, wherein the sipes disposed at the tread edge side are disposed in the shoulder land portions.

5. The tire of claim 3, wherein the width direction sipes are disposed in the center land portion.

6. The tire of claim 1, wherein a radial length of the sipes disposed at the tread edge side is 60% or more to 85% or less of a thickness of a rubber portion of the tread.

7. The tire of claim 1, wherein a radial length of the extending portion is 35% or more to 65% or less of a radial length of the sipes disposed at the tread edge side.

8. The tire of claim 1, wherein a radial length of the protruding portion is 35% or more to 65% or less of a radial length of the sipes disposed at the tread edge side.

9. The tire of claim 1, wherein an amount of protrusion of the protruding portion of the sipes disposed at the tread edge side is 90% or more to 100% or less of a radial length from an end point of the extending portion which is a departure point of the protruding portion to the bending point of the protruding portion.

10. The tire of claim 1, wherein an amount of protrusion of the protruding portion of the sipes disposed at the tread edge side is 40% or more to 60% or less of a radial length of the extending portion.

11. The tire of claim 1, wherein each of the sipes disposed at the tread edge is formed to include a protruding region that extends in a direction of extension of the sipe along the surface of the tread and plate-like regions that extend linearly along the reference plane at either side of the protruding region in the width direction thereof.

12. The tire of claim 11, wherein the plate-like regions are 50% or less of a length, in a tire width direction, of the sipes disposed at the tread edge side.

* * * * *